(12) United States Patent
Knoble

(10) Patent No.: US 6,463,436 B1
(45) Date of Patent: Oct. 8, 2002

(54) INTERACTIVE PHOTOMETRIC CALCULATIONS SYSTEM

(75) Inventor: David W. Knoble, Tupelo, MS (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 09/258,598

(22) Filed: Feb. 26, 1999

(51) Int. Cl.[7] ............................................. G06F 17/30
(52) U.S. Cl. ....................... 707/10; 707/104.1; 709/217
(58) Field of Search ...................... 707/10, 104, 104.1; 709/202, 217; 705/1; 379/220, 917, 900

(56) References Cited

U.S. PATENT DOCUMENTS

| | | | | |
|---|---|---|---|---|
| 5,915,133 A | * | 6/1999 | Hirai et al. | 396/48 |
| 6,081,669 A | * | 6/2000 | Kosako | 396/61 |
| 6,134,548 A | * | 10/2000 | Gottsman et al. | 707/5 |
| 6,144,990 A | * | 11/2000 | Brandt et al. | 709/203 |
| 6,151,450 A | * | 11/2000 | Numalo | 396/48 |

OTHER PUBLICATIONS

*Lighting Handbook, Reference & Application*, 8th edition, Mark S. Rhea Ph.D., published by the Illumination Engineering Society of North America, New York, pp. 411–414; 479–487.

* cited by examiner

Primary Examiner—Greta L. Robinson
(74) Attorney, Agent, or Firm—John F. Salazar; Middleton Reutlinger

(57) ABSTRACT

An interactive system on a server via which a client can remotely submit data used to making photometric calculations in which the system has one or more interrogative interfaces is provided. Data is requested from the client via the interrogative interfaces when the client accesses the system. Data is received from the client by the interactive system. Photometric calculations are performed using the data received from the client and the results of the photometric calculations are delivered to the client.

27 Claims, 3 Drawing Sheets

INTERACTIVE PHOTOMETRIC CALCULATIONS SYSTEM

BACKGROUND OF THE INVENTION

The present invention relates generally to photometric information systems and methods of providing photometric calculations based on data input from a user. More particularly, the invention relates to systems and methods of providing photometric calculations for recommending lighting fixtures.

In the lighting industry, people having different levels of technical knowledge need to determine how many fixtures should be used in a particular area in order to provide efficient lighting that meets acceptable lighting standards. Such people include engineers, contractors, distributors and even sales representatives. The number and type of fixtures needs to be determined for new construction, as well as for areas that are to be renovated, upgraded or remodeled.

In the past, a person would manually perform the necessary calculations to meet the acceptable standards set out by the Illumination Engineering Society of North America ("IES"). Alternatively, the person may contact a lighting manufacturer and request assistance in determining the number of fixtures needed. Generally, information ranging from the type of area (e.g. manufacturing facility or office environment), the dimensions of the area, the reflectances of the area and the illumination necessary must be considered in this process. Such a task is time consuming. Moreover, errors often occur when calculations are performed manually.

Some software packages are available for conducting limited assisted photometric calculations. Such software packages typically will calculate the number of fixtures needed to illuminate a given type of area given the type of fixture chosen and the size of the area. These packages typically use the parameters specified by IES and are available from lighting manufactures and/or distributors. However, use of the packages requires some knowledge of the use of IES calculations.

Also typically, a manufacturer may obtain information from a customer via telephone or fax machine in order to conduct such calculations on behalf of the requesting party, and then the manufacturer provides the results of the calculations to the requesting party. In such a situation, the manufacturer employs technically competent people to perform the calculations for the customer. Once the employees perform the calculations, the manufacturer calls or faxes the answer back to the customer. However, efficiency problems arise when the manufacturer receives an abundance of phone calls which results in a very slow turn around time. This time lag may even be exaggerated in instances where the customer did not provide all the necessary data at the start requiring the manufacturer to contact the customer to obtain the additional information prior to performing the calculations. The manufacturer then performs the calculations and calls the customer back with the answer. Problems exist when delays occur in the turn-around time. For example, customer satisfaction is diminished. In such a case, a contractor may miss anopportunity to quote a new job because he did not receive the calculated information in a timely fashion. As a result, the manufacturer loses a potential sale.

Typically, manufacturers dedicate customer services that are open only approximately 40 hours per week during standard business hours. Thus, making it difficult for customers in need of the calculated information after hours or on the weekends to obtain the necessary information.

Another problem arises for the manufacturer in maintaining a customer service department with the requisite qualifications to calculate such data for the customer. Such a customer service department is expensive to maintain especially as the volume of sales calls grows.

The computation of data to determine the number of fixtures necessary for a particular area has been covered in several editions of IES Lighting Handbooks. See, for example, Mark S. Rea, Lighting Handbook. Reference & Application, 8th edition, published by the Illumination Engineering Society of North America, New York, incorporated herein by reference.

SUMMARY OF THE INVENTION

An object of the invention is to provide a system and method of providing calculations through a computer program that directly interfaces with the customer for lighting applications. A further object is to provide a system and method of providing calculations that is available to the customer 24 hours a day and 7 days a week. Yet another object is to provide photometric calculation information promptly thus reducing a lag time between the customer phone call and the resultant recommended lighting. A further object is to provide a system that could be accessed via the Internet.

To these ends, the invention provides an interactive data processing system that prompts the user to input certain information, provides calculations for the user, and gives a resultant recommendation for the number and type of fixtures needed in a particular application.

In an embodiment the invention provides a method of providing photometric calculations for lighting applications by providing an interactive system on a server via which a client can remotely submit data used in photometric calculations in which the system has one or more interrogative interfaces; requesting the data from the client via the interrogative interfaces when the client accesses the system; receiving the data from the client; performing photometric calculations using the data; and delivering the results of the calculations to the client.

In an embodiment, the method includes providing an option for the user to backup one level in the system.

In an embodiment, the method includes providing default values as an option for selection by the user.

In an embodiment, the method includes repeating the step of requesting the data from the client when the client improperly enters the data.

In an embodiment, the method includes delivering the results verbally.

In an embodiment, the method includes delivering the results via facsimile.

In an embodiment, the method includes delivering the results both verbally and via facsimile.

In an embodiment, the method includes recommending a lighting fixture for the lighting application based on the data received from the client.

In an embodiment, the method includes assigning a personal identification number to the client.

In an embodiment of the present invention a system is provided for performing photometric calculations including a server; a network via which the server can communicate with a client, wherein the server is programmed to present the client with a series of interrogative interfaces via which the client submits data relevant to photometric calculations, to perform photometric calculations based on the submitted data, and to deliver the results of the photometric calculations to the client via the network.

In an embodiment, the network is a telephone network.

In an embodiment, the network is a computer network.

In an embodiment, the results are delivered in realtime.

It is, therefore, an advantage of the present invention to provide a computer system and method of providing calculations for users of different backgrounds in technology and assist the user in determining the recommended number of fixtures needed per area.

Another advantage of the present invention is to provide calculations of data for a customer 24 hours a day and 7 days a week.

Another advantage of the present invention is to provide a computer system and method of providing calculations via the telephone or Internet.

These and other features and advantages of such a computer system and method for providing calculations are described herein in the following detail description of the presently preferred embodiments with reference to the accompanying drawings.

DETAILED DESCRIPTION OF THE DRAWINGS

DETAILED DESCRIPTION OF THE PRESENTLY PREFERRED EMBODIMENTS

Figure 1:
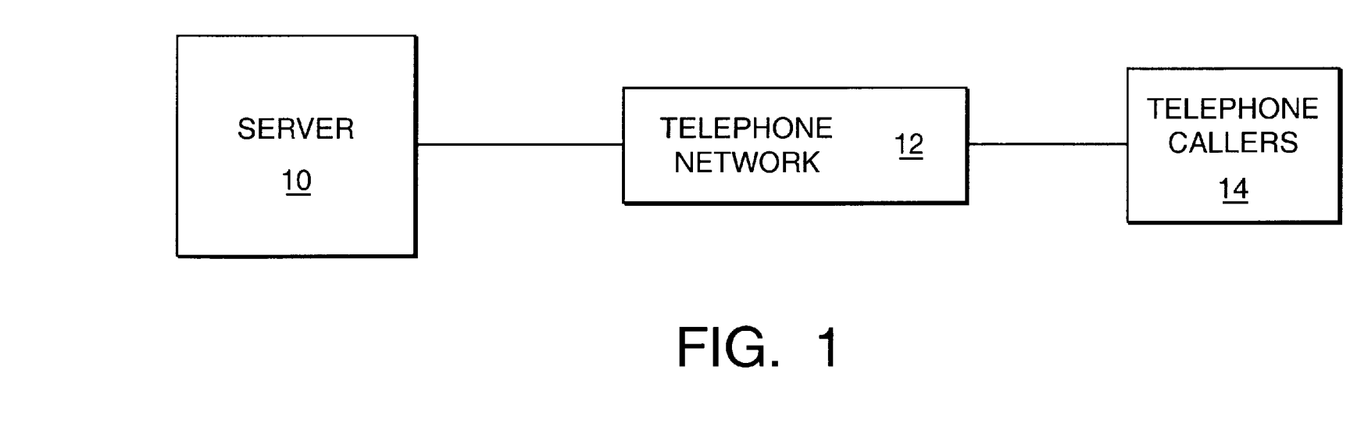
FIG. 1 is a block diagram of a system useful in practicing the invention.

FIG. 1 illustrates, generally, a system on which the invention can be practiced. The illustrated system is a presently implemented telephone based system as will be described next.

In FIG. 1 there is illustrated a server 10 with a suitable computer for running the software needed to conduct the photometric calculations and processing of requests for such calculations. In the presently implemented telephone based system the server includes a Pentium™ 233 MHZ processor with 64 MB of random access memory ("RAM"). Indeed, most personal computers are suitable for the application. A telephone network 12 is connected to the server 10 via a digital signal processor voice card, such as a Digilogic IT-4-241H voice card, to accommodate a number of telephone callers 14 (also referred to herein as clients and/or user) that place calls at various times throughout the day. Alternatively, a modem, modem bank or a bank of "voice modems" may be used to connect the network 12 to the server 10.

Figure 2:
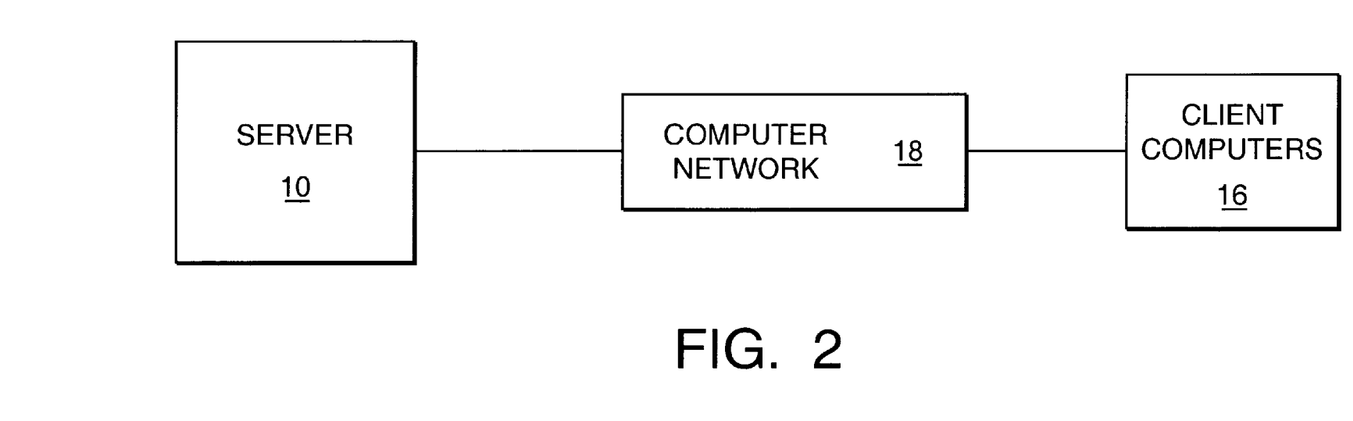
FIG. 2 is a block diagram of an alternative system useful in practicing the invention.

FIG. 2 illustrates an alternative system for interfacing with client computers 16. In this system, the telephone network 12 is replaced by a computer network 18, preferably the Internet. The remote server 10 is capable of receiving and directing communication from a number of client computers 16. Of course, for computer network applications, the server could be connected via a network card, T1 connection or Internet service providers in the known ways.

Figure 3A:
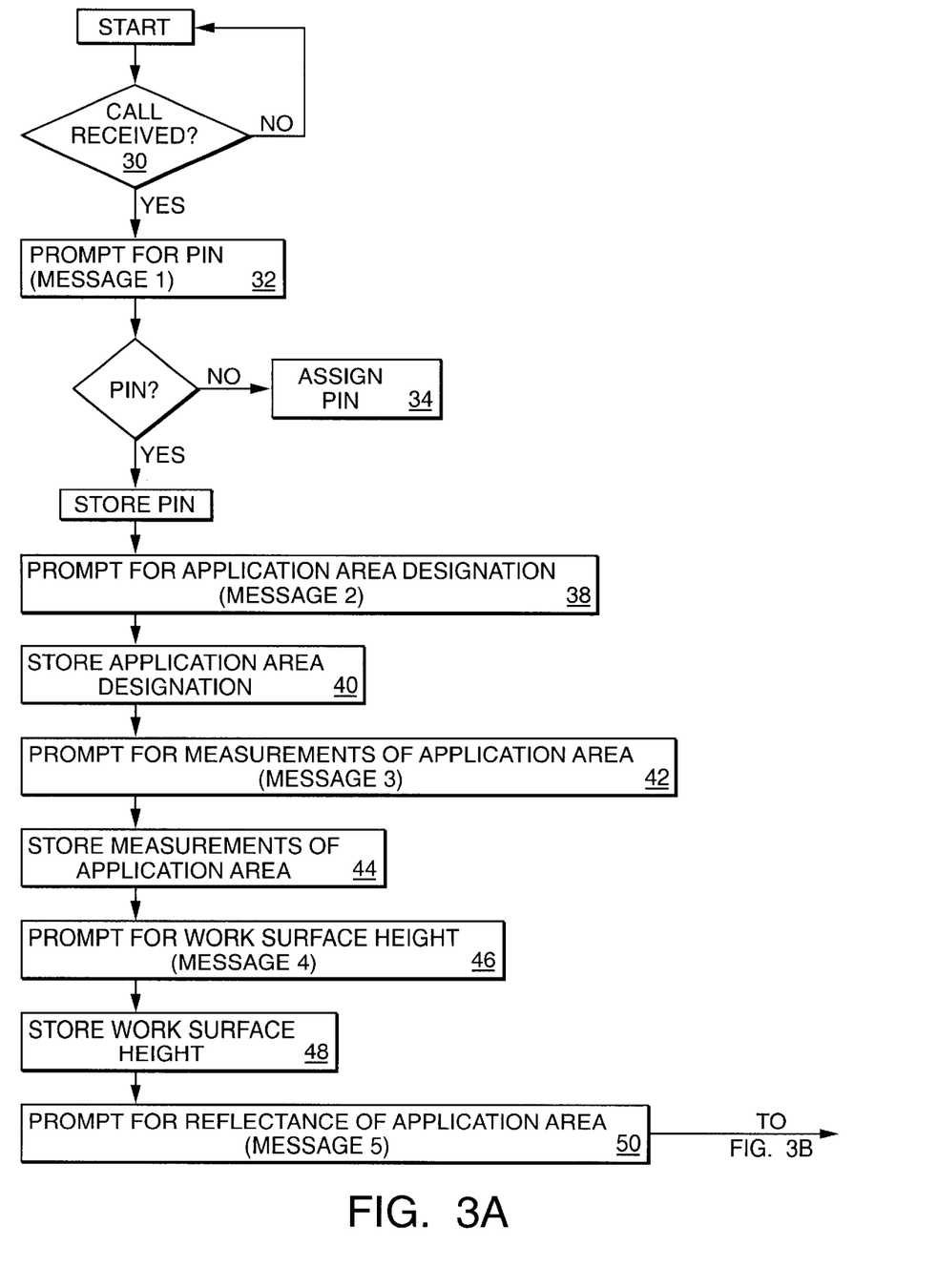
FIG. 3 is a flow chart incorporating principles of the invention.
Figure 3B:
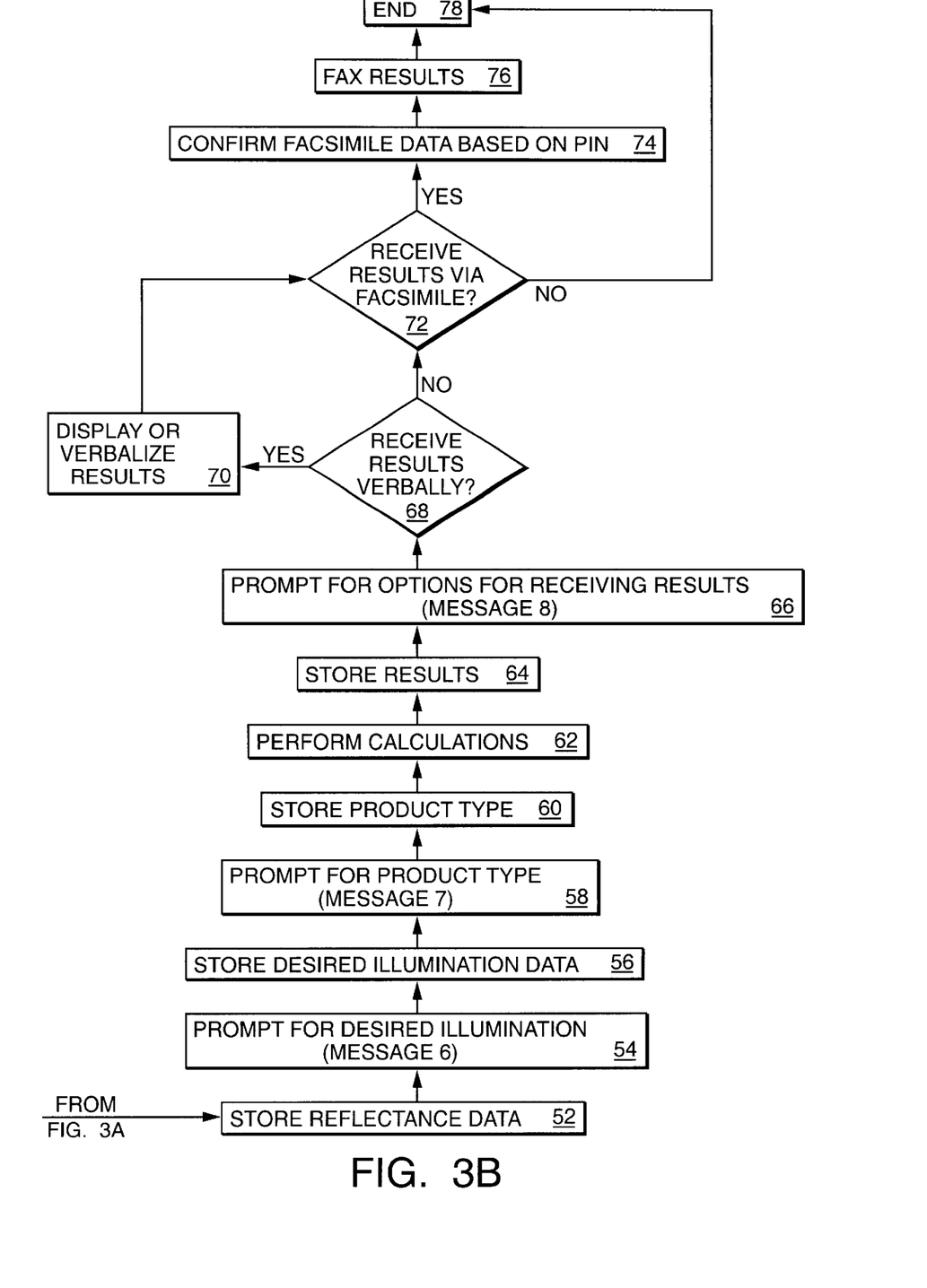

Next, a description of the process implemented on the system of FIGS. 1 and 2 is described, with reference to FIG. 3. Generally, FIG. 3 illustrates a flow chart of a data processing system incorporating principles of the invention used in connection with the telephone network based system portion of FIG. 1. Attached herewith as Appendix A, pages 1 through 9, is a print out of a slide presentation, entitled "Quick Calc" depicting the messages announced by the system and consequences of various expected responses thereto. Appendix A is incorporated herein by reference.

However, it should be readily apparent that the process, with a few minor alterations, can easily be used in conjunction with the computer network system of FIG. 2, such as the Internet.

Specifically, FIG. 3 describes an interactive system that begins at 30 with the system identifying whether a call has been received. Such calls are placed by a user and may be received via the telephone system or via on-line Internet access. If no call has been received by the system, the system remains idle. However, if a call has been received by the system, the system answers the call at 32 and begins to provide a the first of a number of interrogative interfaces for the client. First, the system announces (or delivers) Message 1.

Message 1 requests the user to enter a personal identification number or PIN code (which in the illustrated embodiment is a 5-digit PIN code) or to press the "#" sign if the user is a first time caller. If the caller is a new user of the data processing system (i.e., the caller entered the "#" code), the caller will be assigned a PIN code at 34 for future uses of the system. The PIN code provides a back-up file for the caller in which such information as telephone numbers, fax numbers and addresses may be stored by the manufacturer.

After the PIN code has been entered or a new PIN code is assigned to a new user, the system will announce or deliver Message 2 at 38. Message 2 requests the user to select the area type for the particular application from five options. Generally, the options for the area type include: (1) a "general office area," (2) an "office area with computers," (3) a "manufacturing area," (4) a "warehouse area with aisles," and (5) a "warehouse open area." However, the system may be modified to increase or reduce the type of application areas. The user is then requested to interact with the system by selecting an application area from the five options and pressing the telephone keys or keyboard keys corresponding to the area for the particular application, e.g. 1, 2, 3, 4 or 5.

It is important to note that the user is notified to press the asterisk "*" key at any time during the implementation of the data processing system if the user needs to backup one level within the system. Therefore, if a user has made a mistake and needs to change an earlier selection the user presses the "*" key and the system will easily prompt the user to the previous message. To this end, the user can change an earlier selection and continue to move forward within the system.

Also, as stated above, in this particular application the user has five choices from which to input an answer to Message 2. If the user selects a number that is not given within the message (e.g. the user selects 0 or 6–9) Message 2 will be announced again and the user will be notified that the selection was improper.

Once the user has properly selected the application area, that is, from one of the five options in the menu, the application area designation is stored at 40. The system then prompts the user to enter measurement data of the application area at 42 (Message 3). To this end, the user is prompted with a series of sub-messages relevant to the measurements of the application area. These measurements include the length (in feet) of the area, the width (in feet) of the area and the ceiling height (in feet) of the area. While the ceiling height must be input, the system also requests the user to identify where the fixtures will be mounted in the ceiling. As such, the system prompts the user to identify whether or not suspended fixtures (lower than ceiling height) will be used in the application or whether the fixtures will be mounted at the ceiling height. If the fixtures are designated by the user as mounted at the ceiling height then the system will consider that the mounting height and ceiling height are the same for the application. Throughout Message 3, the user inputs each measurement followed by the pound "#" key after each sub-message prompt by the system. The system stores the application area measurement data at 44. Once the measurements are entered the system will announce or deliver Message 4.

At 46, Message 4 requests the user to select the work surface height: Specifically, the system requests the user to identify if the work surface or work plane height is at: (1) a finished floor; (2) 2½ feet above the finished floor; or (3) 3 feet above the finished floor. Again, a menu identifies a numerical digit that is assigned to each entry, e.g. 1, 2, or 3. Thus, the user can easily push the relevant key to select the work surface height. As noted above, if the user inputs a numerical digit that was not an option, a loop will occur in which Message 4 will be announced again to the user. As a result, the user will have another chance to enter one of the available options. After the user selects from one of the available options, the work surface height designation is stored at 48. The system proceeds to announce or deliver Message 5.

Message 5 requests the user to enter the reflectance of the particular area at 50. Generally, reflectance is expressed as a percentage. The system will ask the user to enter the reflectance for each of the ceiling, the wall and the floor. However, Message 5 provides the option for the user to accept a default value based on the user's entry in Message 2 regarding the application area. For example, if the user selected either a "general office area" or an "office area with computers" in Message 2 then the system assigns a default value for the ceiling reflectance of 80% and a default value for the wall reflectance of 50%. If the user selected a "manufacturing area" in Message 2 then the system assigns the default value for the ceiling reflectance of 50% and the default value for the wall reflectance of 30%. If the user selected a "warehouse area with aisles" or a "warehouse open area" in Message 2 then the system assigns the default value for the ceiling reflectance of 30% and the default value for the wall reflectance of 30%. With respect to the floor reflectance, the default value assigned is 20% for all of the application areas.

In Message 5 the default values are announced in sequence. Again, the user enters the pound "#" key after the entry of each of the reflectances to indicate that the data is complete for the particular entry. To this extent, if the user desires to accept the default value, the user presses the pound "#" key only. The reflectances data is stored at 52. Once Message 5 is complete the system moves forward to prompt the user for illumination data at 54 via Message 6.

Message 6 asks the user to enter the desired illumination in foot candles. Here, the user also has the option to accept the Illumination Engineering Society of North America ("IES") recommended lighting level depending upon the application area selected in Message 2. For example, if the user selected "general office area" then the recommended IES lighting level is 75 foot candles. If the user selected "office area with computers" or "manufacturing area" then the recommended IES lighting level is 50 foot candles. Finally, if the user selected "warehouse open area" or "warehouse area with aisles" then the IES recommended lighting level is 30 foot candles. After the user selects the desired illumination or the IES recommended lighting level Message 6 is complete. The system stores the desired illumination information at 56. The system at 58 is now ready to announce or deliver Message 7 prompting the user to select a product type.

Message 7 involves a selection of the product type for the particular application. Initially, Message 7 announces a recommended lighting fixture for the application area. The recommended lighting fixture is selected by the system based on data input by the user in previous messages. For example, the particular area selected and the mounting height or ceiling light of the fixtures. Possible lighting fixtures recommended by the system include 2×4 parabolics with 3 inch louvers for a general office area where the square footage of the area is less than or equal to 150 feet. However, if the general office area has a square footage greater than 150 feet than the recommended lighting fixture is a 2×4 Lensed Troffer. Also, if the office area includes computers than the recommended lighting fixture is, generally, the 2×4 VDT parabolic for offices with computers. In warehouse or manufacturing areas where the mounting height is greater than 15 feet but less than or equal to 20 feet the recommended lighting fixture is generally Low Bay. Moreover, if the warehouse area or manufacturing area was selected in Message 2 and the mounting height or ceiling height is greater than 20 feet then the recommended lighting fixture is High Bay. An alternative application may be in a warehouse area or manufacturing area in which the mounting height is less than or equal to 15 feet. Here, the recommended lighting fixture is industrial fluorescents.

After the user is prompted with the manufacturer's recommended lighting fixture for the particular application, the system requests the user to either accept the recommendation or select a different fixture. Again, the decision to accept the recommendation or select a different fixture is input by the user by pressing a corresponding number on the keypad or keyboard. As stated above, if the user selects a number that was not within the menu then the system will notify the user that an incorrect option was selected and repeat the message to select one of the options from the menu.

If the user wishes to select a different fixture in response to Message 7 then a fixture menu will be announced to the user. Each fixture on the fixture menu has in it an IES file which contains photometric information. The structure of the IES file is found in a publication of the Illuminating Engineering Society of North America, LM-63-1995. Data in the file is based on photometric testing conducted in an NIST-certified photometric laboratory. In addition to photometric data, the IES file has in it several key words. An IES file may have multiple keywords which have values associated with them. One such keyword is a fixture catalog number and another keyword is the ballast used for the corresponding fixture. This interactive photometric system includes custom keywords that contain information on the lamp lumin depreciation (LLD) as well as the price of each fixture.

Referring to the fixture menu, if the application area is either a "general office area" or an "office area with computers" then the fixture menu initially provides three options for the user to select from, that is: a 2×4 lensed troffer; a 2×4 parabolic with 3" louvers, T-8 electronic; or 2×4 VDT parabolic T-8 electronic in offices with computers. A sub-menu is announced if the user selects the 2×4 lensed troffer. The sub-menu provides three more options to the user regarding the lensed troffer. Here, the user can select from a T-8 electronic ballast 3-lamp troffer, a T-12 magnetic ballast 3-lamp lensed troffer or a T-12 magnetic ballast 4-lamp lensed troffer.

On the other hand, if the area entered in Message 2 is not an "office area" then the fixture menu provides another range of options for the user. Specifically, the user can select either a (1) Low Bay fixture, (2) High Bay fixture, (3) specification industrial flourescent or (4) all-purpose industrial flourescent. Various sub-menus are prompted depending on the user's selection. For example, if the user selects "1" for Low Bay fixture, the sub-menu directs the user to select either 400 Watt Metal Halide or 400 Watt High Pressure Sodium. The fixture product type information is stored at 60.

At the completion of Message 7, the user has input all the necessary data required for the system to begin the data processing. To this extent, the program interface begins at 62 and calculations are computed via software. While the calculations are being performed by the software, advertisements can be played over the system.

The calculations utilize the data entered by the user via the telephone keypad or computer keyboard. Generally, the calculation is performed using photometric data on the computer commonly referred to as a "zonal cavity" calculation. The results of the calculations are returned by voice to the caller with an option for the caller to receive the information via facsimile too.

With respect to the particular area or room cavity, the coefficient of utilization ("CU") is calculated from the data input by the user. This calculation is generally described in the IES Handbook, supra, pp. 411–414, incorporated herein by reference.

When the CU is calculated then the number of fixtures needed to illuminate a room cavity to a desired illumination level can be determined. First a room cavity ratio ("RCR") is calculated as follows:

$$RCR = \frac{5h(l+w)}{lw}$$

where
 h=cavity height,
 l=cavity length,
 w=cavity width.
Next, a light lost factor ("LLF") is calculated as follows:

$$LLF=LDD+LLD,$$

where LDD is the Luminaire Dirt Depreciation and LLD is the Lamp Lumen Depreciation. LDD has been assigned a fixed, reasonable, yet arbitrary, number (0.90) because the user does not enter any information regarding the dirtiness of the area and it is generally understood that particularly dirty areas require either frequent cleaning or more luminaires. LLD is typically obtained from a keyword in the IES file (e.g. [LLD] keyword). This factor typically depends on the lamp type. For example, the LLD would be different for metal halide lamps verses high pressure sodium lamps.

Finally, it is necessary to determine the number of luminaires for the desired illumination level.

$$\text{number of luminaires} = \frac{\overline{E}_{maintained} \times \text{workplane area}}{\text{lamps per luminaire} \times \text{lamp lumens} \times CU \times LLF}$$

In addition to the number of luminaires, the average maintained illumination is also calculated. That is, since the number of illuminaires is an integer, the average. maintained illumination level will, in general, be somewhat different than the desired illumination level. For example, if one less fixture were used, than the calculated illumination level would be less than the desired level. On the other hand, if the calculated number of fixtures is used, the calculated illumination level is slightly higher than the desired level.

After the calculations have been performed the results are stored at 64 and Message 8 is announced at 66. Message 8 informs the user that the calculations are complete and provides options to the user regarding the user's preference for receiving the results. Generally, the results are received either verbally or via facsimile at the end of the call, or both. Again, the user selects a number (e.g. 1, 2 or 3) on the keypad or keyboard from the menu in order to select the appropriate option.

If the user selects the option to receive the results verbally (e.g. selects "1") at 68 than the data processing system opens the file and summarizes (i.e. announces) the overview of data input at 70. For example, the system identifies the type of room selected for the particular application. Then the system reveals to the user the number of fixtures recommended and the desired spacing for the fixtures. Moreover, the system provides the average maintained foot candles, the watts per square foot, the lamp type, the catalog number for the lamp type and price per fixture. Generally, the price per fixture is based on the trade services price.

If the user requests to receive the results verbally at 68 and via facsimile (e.g. selects "2") at 72 or via facsimile alone (e.g. selects "3") then the system is prompted to collect the appropriate facsimile information (including telephone number). Here, the system checks the database for the user's personal information at 74 (if available). If the information is available in the database the user is prompted by the system to select whether the information should be sent to the primary fax number or whether the information should be sent to an alternate fax location. If the user selects an alternate fax location, then the system requests the user to enter the alternate fax number followed by the "#" key. Once this information is input into the system the fax information is stored until the end of the call. The information that is returned via facsimile is identical to the information that is returned to the user verbally plus the light loss factor information at 76. Also, if the database does not have the requisite user personal information because, for example, the user is a first time caller and the PIN number is new. In such cases, the system requests the user to enter the fax number followed by the "#" key. The fax number is then stored within the data base for future reference.

Finally, at 78, the system has completed its data processing and signs off with the user.

In the computer network applications over the Internet, the same or similar messages are presented in the form of "to fill in the blank" format on the computer screen of the client computers 16. Thus a client will navigate a series of interrogative interfaces having the message set forth above and enter data as requested either by keying in information or selecting predetermined data via pull down menus. The results of the calculations then will be presented on the client computer screen and made available for printing.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

APPENDIX A

QuickCalc

*Fax-on-Demand*

*Call Flow*

1-800-THOMASQ
*(number unconfirmed)*

*"Thank You for calling Thomas Lighting's QuickCalc Application Support System with Fax-on-Demand.*

*Please enter your 5-digit PIN code or press # if you are a new user."*

---

You may enter your selection at any time or
press the * key at anytime during this call to backup one level.

---

ENTER APPLICATION (AREA)

*"Please choose an area type from
the following 5 options:"*

For General Office Area.................PRESS 1
For Office Area w/computers...........PRESS 2
For Manufacturing Area.................PRESS 3
For Warehouse Area w/Aisles..........PRESS 4
For Warehouse Open Area.............PRESS 5

ENTER MEASUREMENTS

"Please enter the LENGTH in feet of the area, followed by the # key."

"Please enter the WIDTH in feet of the area, followed by the # key."

"Please enter the CEILING HEIGHT in feet of the area, followed by the # key."

"For suspended fixtures lower than ceiling height, enter the mounting height in feet from floor to bottom of the fixture followed by the # key
or
if fixture will be mounted at ceiling height press the # key alone."

[if mounted at ceiling height, then C.H. = M.H.]

ENTER WORK SURFACE HEIGHT

"Please select the WORK SURFACE or workplane HEIGHT:"

For at finished floor........................PRESS 1
For 2 and ½ feet above finished floor...PRESS 2
For 3 feet above finished floor............PRESS 3

ENTER REFLECTANCE

*"Please enter the CEILING REFLECTANCE,
followed by the # key
or
press the # key alone to accept default value of ___."*

<if OFFICE_AREA, then CEILING_REFLECTANCE = 0.8 (verbal eighty-percent)
if MANUFACTURING_AREA, then CEILING_REFLECTANCE = 0.5 (verbal fifty-percent)
if WAREHOUSE_AREA, then CEILING_REFLECTANCE = 0.3 (verbal thirty-percent) >

*"Please enter the WALL REFLECTANCE,
followed by the # key
or
press the # key alone to accept default value of ___."*

<if OFFICE_AREA, then WALL_REFLECTANCE = 0.5 (verbal fifty-percent)
if MANUFACTURING_AREA, then WALL_REFLECTANCE = 0.3 (verbal thirty-percent)
if WAREHOUSE_AREA, then WALL_REFLECTANCE = 0.3 (verbal thirty-percent) >

*"Please enter the FLOOR REFLECTANCE,
followed by the # key
or
press the # key alone to accept default value of
20%<0.2> FLOOR REFLECTANCE."*

ENTER DESIRED ILLUMINATION

*"Please enter the desired illuminance in FOOT CANDLES, followed by the # key*
*or*
*press the # key alone to accept the IES recommended Lighting Level of*

<if OFFICE1_AREA, then FC = 75 (verbal 75 foot candles)
if OFFICE2_AREA or MANUFACTURING_AREA, then FC = 50 (verbal 50 foot candles)
if WAREHOUSE_AREA, then FC = 30 (verbal 30 foot candles) >

*for this application."*

---

ENTER PRODUCT TYPE

*"The recommended lighting fixture for your application is ________."*

<if OFFICE1_AREA and SQFT <= 150, then FIXTURE = " 2x4 Parabolic w/3" Louvers"
if OFFICE1_AREA and SQFT > 150, then FIXTURE = " 2x4 Lensed Troffer"
if OFFICE2_AREA, then FIXTURE = " 2x4 VDT Parabolic for offices w/computers"
if (WAREHOUSE_AREA or MANUFACTURING_AREA) and (15' < M.H. <= 20'), then FIXTURE = "Low Bay"
if (WAREHOUSE_AREA or MANUFACTURING_AREA) and (M.H. > 20'), then FIXTURE = "High Bay"
if (WAREHOUSE_AREA or MANUFACTURING_AREA) and (M.H. <= 15'), then FIXTURE = "Industrial Fluorescent>"

*"We suggest this fixture for energy efficiency.*
*To accept this recommendation PRESS 1,*
*or*
*To select a different fixture PRESS 2."*

FIXTURE MENU:

*(if Office_Area)*
    For 2x4 Lensed Troffer..................................................................PRESS 1

For T-8 Electronic Ballast 3-Lamp Lensed Troffer.........PRESS 1
        For T-12 Magnetic Ballast 3-Lamp Lensed Troffer........PRESS 2
        For T-12 Magnetic Ballast 4-Lamp Lensed Troffer .......PRESS 3

For 2x4 Parabolic with 3" Louvers, T-8 Electronic............................PRESS 2
    For 2x4 VDT Parabolic T-8 Electronic in offices with computers..........PRESS 3

*(else)*
    For Low Bay..................................................................................PRESS 1

For 400 Watt Metal Halide..................................PRESS 1
        For 400 Watt High Pressure Sodium......................PRESS 2

For High Bay................................................................................PRESS 2

For 400 Watt Metal Halide..................................PRESS 1
        For 400 Watt High Pressure Sodium......................PRESS 2
        For 1000 Watt Metal Halide................................PRESS 3
        For 1000 Watt High Pressure Sodium....................PRESS 4

For Specification Industrial Fluorescent..........................................PRESS 3
    For All-Purpose Industrial Fluorescent...........................................PRESS 4

For 4'................................................................................PRESS 1

For standard T-12 magnetic..........PRESS 1
            For standard T-8 electronic...........PRESS 2
            For high output T-12 magnetic......PRESS 3

For 8'................................................................................PRESS 2

For Standard T-12 Magnetic.........PRESS 1
            For High Output T-12 Magnetic....PRESS 2

PERFORM PROGRAM INTERFACE

(for CALCULATION)

(via DLL)

ADVERTISEMENTS (Play market promos, approx. 5 seconds, via voice file during program execution. Voice files can be cycled for varying advertisements. Will use in-house recording option to create/change ads on a regular basis.)

ENTER ACTION

*"Your Thomas QuickCalc is now complete.
After receiving your results you may return to the MAIN menu by pressing the # key."*

To receive results verbally..........................PRESS 1
To receive results verbally and via fax.............PRESS 2
To receive results via fax at the end of this call...PRESS 3

(If 1):

RETURN INFORMATION

- <open_iesfile(ies_filename); open_room(...)>
- Number of fixtures <number_fixtures(desired_fc)>
- Spacing <fixture_spacing()>
- Average Maintained Foot Candles <number_footcandles(number_fixt)>
- Watts/sq. ft. <get_watts_den()>
- Lamp Type <get_lamp()>
- Catalog # <get_catno()>
- Price per fixture (based on Trade Services price) <get_price()>
- Light Loss Factor (to be returned in Fax ONLY) <get_lld()>

(If 2):

COLLECT FAX INFORMATION

- System will check database for user's personal information (if available)
- If available (user info in database)
  For fax to be sent to your primary fax number............PRESS 1
  (fax information is then stored until end of call)
  For fax to be sent to an alternate fax location...............PRESS 2
  "Please enter alternate fax number followed by the # key."

- If unavailable (must be new PIN)
  Please enter fax number followed by the # key.
  (fax number is then stored in database for future reference)

Thank You for calling Thomas Lighting's QuickCalc Application Support System. Goodbye.

Reference Table for QuickCalc application

| Fixture Type | Catalog # | IES Filename | List Price |
|---|---|---|---|
| Lensed Troffer for 3 T-12 Lamps | 2TG340-01 | 2TG340.IES | $TradeSvc |
| Lensed Troffer for 4 T-12 Lamps | 2TG440-01 | 2TG440.IES | $TradeSvc |
| Lensed Troffer for 3 T-8 Lamps | 2TG332-01-01-1/3-EB | 2TG332EB.IES | $TradeSvc |
| Parabolic, 3-Lamp Fixture | 2P3GS332-36SL-1/3-EB | 2P3GS332.IES | $TradeSvc |
| VDT Parabolic, 3-Lamp Fixture | 2UGS332-39FL-1/3-EB | 2UGS332.IES | $TradeSvc |
| Low-Bay, 400 Watt Metal Halide | LBN400M-CRA | LBN400M.IES | $TradeSvc |
| Low-Bay, 400 Watt High Pressure Sodium | LBN400S-CRA | LBN400S.IES | $TradeSvc |
| High-Bay, 400 Watt Metal Halide | HBY400M-MT-S16 | HBY40M16.IES | $TradeSvc |
| High-Bay, 400 Watt High Pressure Sodium | HBY400S-MT-S16 | HBY40S16.IES | $TradeSvc |
| High-Bay, 1000 Watt Metal Halide | HBY10XM-MT-S24 | HBY1XM24.IES | $TradeSvc |
| High-Bay, 1000 Watt High Pressure Sodium | HBY10XS-MT-S24 | HBY1XS24.IES | $TradeSvc |
| 4' All-purpose Industrial Fluorescent Standard Lamp | IA-240 | IA240.IES | $TradeSvc |
| 4' All-purpose Industrial Fluorescent T-8 Electronic | IA232-1/2-EB | IA232EB.IES | $TradeSvc |
| 4' All-purpose Industrial Fluorescent High-output Lamp | IA-248-HO | IA248HO.IES | $TradeSvc |
| 8' All-purpose Industrial Fluorescent Slimline Lamp | IA-296 | IA296.IES | $TradeSvc |
| 8' All-purpose Industrial Fluorescent High-output Lamp | IA-296HO | IA296HO.IES | $TradeSvc |
| 4' Specification Industrial Fluorescent Standard Lamp | 1F-240PP | 1F240.IES | $TradeSvc |
| 4' Specification Industrial Fluorescent T-8 Electronic | 1F232-PP-1/2-EB | 1F232EB.IES | $TradeSvc |
| 4' Specification Industrial Fluorescent High-output Lamp | 1F-248HOPP | 1F248HO.IES | $TradeSvc |
| 8' Specification Industrial Fluorescent Slimline Lamp | 1F-296 | 1F296.IES | $TradeSvc |
| 8' Specification Industrial Fluorescent High-output Lamp | 1F-296HO | 1F296HO.IES | $TradeSvc |

What is claimed is:

1. A method of providing photometric calculations for lighting applications, comprising the steps of:
   providing an interactive system on a server via which a client can remotely submit data used in making photometric calculations, said system having one or more interrogative interfaces;
   requesting said data from the client via said one or more interrogative interfaces when said client accesses the system;
   receiving said data from the client;
   performing photometric calculations using said data;
   delivering the results of said calculations to the client;
   said photometric calculations including determining the number of fixtures needed to properly illuminate a room to a desired illumination level.

2. The method in claim 1, wherein the step of requesting said data further comprises the step of providing an option for the user to backup one level in the system.

3. The method in claim 1, wherein the step of receiving data further comprises the step of providing default values as an option for selection by the user.

4. The method in claim 1, wherein the step of receiving said data from the client further comprises the step of repeating the step of requesting said data from the client when the client improperly enters said data.

5. The method in claim 1, wherein the step of delivering the results is verbal.

6. The method in claim 1, wherein the step of delivering the results is via facsimile.

7. The method in claim 1, wherein the step of delivering the results is both verbal and via facsimile.

8. The method in claim 1, further comprising the step of recommending a lighting fixture for the lighting application based on said data.

9. The method in claim 1, further wherein the step of requesting said data further comprises the step of assigning a personal identification number to the client.

10. The method in claim 1, wherein the step of requesting said data further comprises the steps of:
    requesting an application area;
    requesting dimensional data relevant to the application area;
    requesting a work surface height relevant to the application area;
    requesting reflectance data based on the application area;
    requesting a desired illumination; and
    requesting a product type.

11. A method of providing photometric calculations for lighting applications, comprising the steps of:
    providing an interactive system;
    communicating with a remote client via said interactive system;
    prompting interrogative interfaces from said client, said interrogative interfaces including requesting an application area, dimensional data relevant to the application area, a work surface height relevant to the application area, reflectance data based on the application area, desired illumination, and a product type;
    receiving the data from said client;
    selecting default values based on said step of receiving data from the client; executing photometric calculations using the data;
    delivering results of said photometric calculations to said remote client in real time;
    wherein said photometric calculations include determining the number said products needed to properly illuminate a room to a desired illumination level based upon said responses to said interrogative interfaces.

12. The method of providing photometric calculations for lighting applications of claim 11 wherein said photometric calculations include calculation for a number of said products necessary to produce said requested illumination based upon said data obtained from said interrogative interfaces, said data including a wall, a ceiling and a floor reflectance.

13. The method of claim 11 wherein said method further includes the step of calculation of an illumination level for said application area dependent upon said dimensional area, said number of said products and said reflectance data.

14. A system for determining the number of lighting units required to properly light a work area, comprising:
    a server, said server operably connected to a communications network;
    said server having instructions thereon for performing the steps of:
      prompting responses from a client, said responses including data representative of an application area to be illuminated, dimensional data of said application area, reflectance data of said area to be illuminated, work surface height in said application area and an illumination source product type;
      performing photometric calculations based upon said responses from said client;
      determining a number of illumination source product type necessary to properly illuminate said application area based upon said photometric calculations.

15. The system of claim 14 wherein said photometric calculations include calculation of a coefficient of utilization based upon said responses prompted form said client.

16. The system of claim 15 wherein said reflectance data and said illumination source product type is derived data.

17. The system of claim 16 wherein said photometric calculations include calculation of a room cavity ratio and a light lost factor for determining said number of illumination source product type.

18. The system of claim 16 wherein said illumination source product type is at least one illumination source product type provided to said client for selection.

19. The system of claim 18 wherein said at least one illumination source product type is a plurality of illumination source product types.

20. The system of claim 19 wherein each of said plurality of illumination source product types provided for said client for selection has an associated data file, said associated data file including photometric information.

21. The system of claim 20 wherein said associated data file has custom keyword data.

22. The system of claim 21 wherein said system calculates said number of illumination source product types based upon said associated data file.

23. The system of claim 22 wherein said system calculates an average maintained illumination based upon said responses from said client and said associated data file.

24. A system for determining the number of lighting units required to properly light a work area, comprising a server, said server operably connected to a communications network, said server having instructions thereon for performing the steps of:
    prompting responses from a client, said responses including data representative of an application area to be illuminated;
    supplying to said client default values, said default values including data representing necessary lighting level for said application area;

providing to said client by said system through said communications network based upon said responses at least one light fixture for selection by said client;

associating by said system a data file to each of said at least one light fixture presented to said client, said data file having photometric information;

performing photometric calculations based upon said responses from said client and said associated data file;

determining a number of light fixtures selected by said client to properly illuminate said application area based upon said photometric calculations.

25. The system of claim 24 wherein said system provides default data to said client representative of reflectance for the ceiling, wall and floor of said application area.

26. The system of claim 25 wherein said photometric calculations include calculation of room cavity ratio and light loss factor for determining said number of light fixtures.

27. A method of supplying a number of light fixtures needed to properly illuminate an application area over a communication network, comprising:

obtaining responses from a client through said communication network, said responses including data representative of an application area to be illuminated;

supplying to said client default values, said default values including data representing necessary lighting level for said application area as well as reflectance data for the ceiling, wall and floor of said application area providing to said client through said communications network based upon said responses at least one light fixture for selection by said client;

associating a data file to each of said at least one light fixture presented to said client, said data file having photometric information;

performing photometric calculations based upon said responses from said client and said associated data file;

determining a number of light fixtures selected by said client to properly illuminate said application area based upon said photometric calculations, including calculation of room cavity ratio and light lost factor for determining said number of light fixtures.

* * * * *